United States Patent
Doran, Jr. et al.

(10) Patent No.: US 6,385,766 B1
(45) Date of Patent: May 7, 2002

(54) METHOD AND APPARATUS FOR WINDOWS-BASED INSTALLATION FOR INSTALLING SOFTWARE ON BUILD-TO-ORDER COMPUTER SYSTEMS

(75) Inventors: Bobby G. Doran, Jr., Austin; Bill Hyden; Terry Wayne Liles, both of Round Rock, all of TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/315,657

(22) Filed: May 20, 1999

(51) Int. Cl.[7] ............................................. G06F 9/445
(52) U.S. Cl. .............................. 717/11; 717/3; 707/203
(58) Field of Search ..................... 717/3, 11; 705/1; 707/203

(56) References Cited

U.S. PATENT DOCUMENTS

| | | | |
|---|---|---|---|
| 4,558,413 A | * 12/1985 | Schmidt et al. ............ | 707/203 |
| 5,247,683 A | 9/1993 | Holmes et al. ............ | 709/221 |
| 5,421,009 A | 5/1995 | Platt ........................... | 709/221 |
| 5,577,244 A | * 11/1996 | Killebrew et al. ............ | 717/3 |
| 5,748,575 A | 5/1998 | Lee ............................. | 369/30 |
| 5,794,052 A | * 8/1998 | Harding ....................... | 717/11 |
| 5,802,297 A | 9/1998 | Engquist ..................... | 709/212 |
| 5,805,897 A | 9/1998 | Glowny ...................... | 717/11 |
| 5,835,777 A | 11/1998 | Staelin ........................ | 717/11 |
| 5,842,024 A | 11/1998 | Choye et al. ................ | 717/11 |
| 5,867,714 A | * 2/1999 | Todd et al. .................. | 717/11 |
| 5,903,897 A | * 5/1999 | Carrier et al. ............... | 707/203 |
| 5,991,774 A | * 11/1999 | Tate et al. .................. | 707/203 |
| 5,995,757 A | * 11/1999 | Amberg et al. .............. | 717/11 |
| 6,047,129 A | * 4/2000 | Frye .............................. | 717/11 |
| 6,175,364 B1 | * 1/2001 | Wong et al. ................. | 345/763 |
| 6,178,546 B1 | * 1/2001 | Mcintyre ...................... | 717/3 |
| 6,195,795 B1 | * 2/2001 | Block et al. ................. | 717/11 |
| 6,216,112 B1 | * 4/2001 | Fuller et al. ................. | 705/14 |
| 6,256,773 B1 | * 7/2001 | Bowman-Amuah ............ | 717/1 |

OTHER PUBLICATIONS

Hall et al., "A cooperative aproach to support software deployment using software dock", ACM ICSE, pp 174–183, 1999.*

Mather, "Automated installation and updating of window based internet applications at James Madison University", ACM pp 207–209, Sep. 1995.*

Green, "Component based software development implications for documenstion", ACM pp 159–164, Apr. 1999.*

* cited by examiner

*Primary Examiner*—Mark R. Powell
*Assistant Examiner*—Anil Khatri
(74) *Attorney, Agent, or Firm*—Haynes and Boone, LLP (57) ABSTRACT

A method for automated installation of software packages in a computer system includes loading an operating system onto the computer system. The operating system is provided with a hook for initiating a windows-based install of prescribed software packages during an operating system setup (OS setup). At least one prescribed software package and a corresponding windows-based software package installer are loaded onto the computer system. The operating system setup is then executed. Lastly, the windows-based install of the at least one prescribed software package is initiated in response to the hook, the windows-based install being carried out according to the corresponding software package installer.

38 Claims, 2 Drawing Sheets

Fig. 3

METHOD AND APPARATUS FOR WINDOWS-BASED INSTALLATION FOR INSTALLING SOFTWARE ON BUILD-TO-ORDER COMPUTER SYSTEMS

CROSS-REFERENCE TO CO-PENDING APPLICATION

This application relates to co-pending U.S. patent application Ser. No. 08/919,959, filed on Aug. 29, 1997, entitled "Software Installation and Testing for a Build-to-order Computer System", naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/984,357, filed on Dec. 3, 1997, entitled "Technique for Performing Factory Installation of Software", naming John A. Odendahl as inventor. The co-pending application is incorporated herein by reference in its entirety, and is assigned to the assignee of the present invention.

This application relates to co-pending U.S. patent application Ser. No 08/920,773, filed on Aug. 29, 1997, entitled "Software Installation and Testing for a Build-to-order Computer System", naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 08/921,438, filed on Aug. 29, 1997, entitled "Database for Facilitating Software Installation and Testing for a Build-to-suit Computer System", naming Richard D. Amberg, Roger W. Wong and Michael A. Brundridge as inventors. The co-pending application is incorporated herein by reference in its entirety, and is assigned to the assignee of the present invention.

This application relates to co-pending U.S. patent application Ser. No. 09/236,862, filed on Jan. 25, 1999, entitled "Recoverable Software Installation Process and Apparatus for a Computer System", naming Alan E. Beelitz and Richard D. Amberg as inventors. The co-pending application is incorporated herein by reference in its entirety, and is assigned to the assignee of the present invention.

This application relates to co-pending U.S. patent application Ser. No. 09/271,581, filed on Mar. 18,1999, entitled "System and Method for Installing System Manufacturer Provided Software", naming Anil Rao and Wayne Weilnau as inventors. The co-pending application is incorporated herein by reference in its entirety, and is assigned to the assignee of the present invention.

This application relates to co-pending U.S. patent application Ser. No. 09/169,324, filed on Oct. 9, 1998, entitled "Factory Installing Desktop Component For Active Desktop", naming James McGlothlin and Roy Stedman as inventors. The co-pending application is incorporated herein by reference in its entirety, and is assigned to the assignee of the present invention.

This application relates to co-pending U.S. patent application Ser. No. 09/237,760, filed on Jan. 26, 1999, entitled "A Method of Installing Software on and/or Testing a Computer System", naming Richard D. Amberg, Roger W. Wong and Michael Lynch as inventors. The co-pending application is incorporated herein by reference in its entirety, and is assigned to the assignee of the present invention.

BACKGROUND

The disclosures herein relate generally to computer systems, and more particularly, to a method and apparatus for windows based installation of software in a build-to-order computer system.

Presently in the computer manufacturing industry, computer manufacturers are employing hard disk drive image loading for the installation of software onto a hard drive of a computer system. Such image loading occurs during the manufacturing of the computer system, typically for producing only one of several different software bundles. Image loading, however, is an inflexible and resource intensive solution when considered for use in a custom configured build-to-order computer system manufacturing process.

In build-to-order manufacturing of custom configured computer systems, the computer manufacturing process of build-to-order includes not only hardware, but also software. This capability of build-to-order for computer systems enables customers to order virtually any combination of software application packages that can be downloaded and/or installed at the factory onto a custom configured computer system before the computer system is shipped. As presently available software packages are exponentially larger and more complex than software packages of the past, the task of installing various combinations of the same in the build-to-order manufacturing of custom configured computer systems is an equally complex process. In the software installation process of build-to-order computer manufacturing, independent software vendor (ISV) and independent hardware vendor (IHV) software must first be reverse engineered using internally developed tools in order to create automated packages for use in the factory installation of the same on a custom configured computer system. The present build-to-order computer system manufacturing factory software installation process does not provide an environment that can avoid the reverse engineering of an originating software vendor's installation routine.

As discussed, for a build-to-order manufacturing process, installation of third party software on a custom configured computer system has required reverse engineering of the third party software install routine in order to incorporate an automatic installation of that third party software in the manufacturing process. That is, a desired third party software package would be manually installed on a test computer system, an investigation carried out to see what the install does, and then code would be written to replicate that install for custom configured computer systems to be built in the build-to-order manufacturing process. During reverse engineering, the content of an installation of the third party software installed on a given operating system platform of the test computer system is captured (i.e., recorded). The content may include added files and/or modifications to existing files having occurred as a result of the installation. In other words, by reverse engineering a method of installing third party software (without using the third party's install software, except it's use during the reverse engineering during the reverse engineering phase), the custom configured computer system manufacturer creates unique install routines for automatically installing various third party software packages on the unique custom configured computer systems being manufactured.

Operating system setup (OS setup) is a process that the operating system goes through, either in the factory or at the customer site, at first boot and in which the operating system becomes fully functional. In the current process, suitable instructions are placed in the OS setup to hook into the OS setup for installing third party software packages using forced install installer software. The forced install installer software, generated from the reversed engineering effort, is specifically created for each respective third party software package for that purpose. Whenever OS setup calls the forced install installer for a given third party software package, the forced install installer makes changes to the target custom configured computer system as captured during the reverse engineering of the respective third party software package install. One disadvantage of the reverse engineered forced install method is that there is no querying of the operating system during the OS setup and forced install. The manufacturing process does not query the operating system to know what operating system it is. The operating system could include, for example, Windows 95, Windows 98, Windows NT, or any other operating system platform. As a result, a separate work effort is required for creating a reverse engineered forced install installer program for each third party software package and operating system platform combination. Reverse engineering of the third party software package installs also makes the build-to-order manufacturing process less economical.

A software download of a given third party software package includes placing the third party software code on a partitioned hard disk drive of a target computer system. Installing the third party software package on the target system includes integrating the third party software package with the operating system of the target system.

Figure 1:
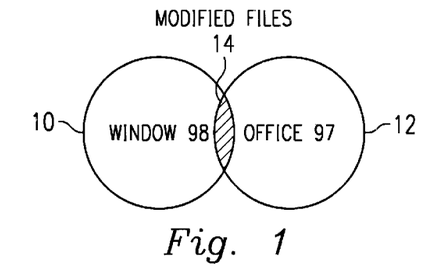
FIG. 1 is a circle diagram view of the interaction of an operating system and an installed third party software application package on a hard disk drive.

With reference to FIG. 1, a diagram illustrative of the two third party software packages installed on the hard disk drive of a target computer system is shown. A first software application may include an operating system, such as, Microsoft Windows 98 operating system. The Windows 98 circle 10 is representative of the files added to the hard drive as a result of installing the Windows 98 operating system. A second software package may include Microsoft Office 97. The Office 97 circle 12 is representative of files added to the hard drive as a result of installing the Office 97 software package onto the target computer system running the Windows 98 operating system. The intersection 14 of the Windows 98 circle 10 and the Office 97 circle 12 is representative of those files which have been modified as a result of installing Office 97 onto the hard drive of the target system. Additional third party software packages can be installed which will result in further added and modified files, the installation effects of which will be unique to the target computer system and as a function of any third party software applications which may already be installed on the target computer system. With the reverse engineering process, the content of the hard drive before an installation and after the installation is used to determine what files have been added, what files have been modified, etc. (i.e., collectively referred to as changes) as a consequence of a manual installation of a third party software application. The changes are recorded and used subsequently during the manufacture of custom configured computer systems during an automated forced install of a corresponding third party software package.

During the software download process, all files of the software application packages ordered for a custom configured computer system are downloaded from a network server (or other media) onto the hard disk drive of the target computer system. The target system is then rebooted, upon which the operating system (e.g., Windows 98) begins to setup. When the manufacturing process reaches a prescribed point in the operating system setup, respective changes which have been captured during the reverse engineering of a given third party install are then applied to the hard disk drive for each third party software application package ordered with the custom configured computer system. Files modified by one software installation may also be modified by another subsequent software installation. Forced install is a blind install wherein the last installation to modify a given shared file would endure. Forced install thus potentially adversely affects any previously installed software package on a given hard drive. All possible combinations of third party software packages on a target system are not reverse engineered, since to do the later would render the build-to-order manufacturing process uneconomical. With the reverse engineering process, the starting point begins with the operating system (e.g., Windows 95, Windows 98, Windows NT, or other operating system). Each third party software package install would need to be reverse engineered for use in an automated installation on a target computer system with a given operating system. In addition to the operating system platform, reverse engineering of the third party software package install is per language (i.e., English, French, German, Japanese, etc.). A reverse engineered install for Windows 95 English will most likely not work for Windows 98 English, nor for Windows 95 French, etc. With current build-to-order manufacturing of custom configured computer systems, computers are manufactured and shipped with one of approximately twenty-five (25) possible languages per operating system. If the manufacturer ships three (3) operating systems, then there exist possibly seventy-five (75=3×25) separate reverse engineering work efforts to support complete automated install of the third party software packages which are available for order from the manufacturer. In addition to developing the reverse engineered forced install of a third party software package, there is also qualification, testing, validation (i.e., integration testing), and piloting before such reverse engineered forced install can be placed on-line in the factory. All of the above requires time in addition to work effort. Reverse engineering of an install can adversely impact time-to-market for the introduction of a new operating system and/or third party software package to become an available option for order from the manufacturer.

With respect to forced install, development includes recording added files and modified files. Typically, development is performed on only one computer system which is assumed to be a good sample of what a give third party software application package will be installed on. In essence, however, there is no real way of installing an application on one computer system that replicates the permutations of all possible configurations which can be fabricated by the build-to-order factory. In other words, with the development of the forced install, one scenario is captured and then applied to different scenarios. In addition, personnel who perform the reverse engineering of a software package installation must have a prescribed high level of expertise in order to perform the reverse engineering in a reliable manner.

While reverse engineering provides a solution for software installation in build-to-order manufacturing of computer systems, it is however not without disadvantages. A first disadvantage of reverse engineering is that it is time consuming. Because of differences between operating system platform languages (e.g., English, French, German, Japanese, etc.), software applications normally need to be reverse engineered for each operating system platform language combination. For example, three operating systems multiplied by twenty-five (25) languages equals seventy-five (75) separate work efforts per software application package. Separate work efforts have a significant impact upon time to market. For example, a time to market of one month may be considered competitive, whereas, a time to market of six months is too long and non-competitive.

A second disadvantage of reverse engineering is that it requires a forced installation. That is, the output of reverse engineering is normally forced to install without regard to possible alternative configuration differences. This means that decision logic contained in the original application installation is lost with the reverse engineering. For example, if an application installs differently based on the detection and existence of certain hardware (e.g., a removable hard disk drive or other hardware), the corresponding installation logic is disadvantageously lost with the reverse engineering of the software application package's installation.

Additionally, another disadvantage of reverse engineering is that it requires extensive testing. Reverse engineering is susceptible to the introduction of issues that would not otherwise exist in the actual application installation. Extensive configuration testing is thus required to ensure that a captured installation functions correctly. This is further compounded by the fact that each operating system language requires a separate work effort and each of those efforts have the opportunity to introduce unique incompatibilities.

An improved software installation process for use in the manufacturing of custom configured computer systems is desired.

SUMMARY

According to one embodiment, a method for automated installation of software packages in a computer system includes loading an operating system onto the computer system. The operating system is provided with a hook for initiating a windows-based install of prescribed software packages during an operating system setup (OS setup). At least one prescribed software package and a corresponding windows-based software package installer are loaded onto the computer system. The operating system setup is then executed. Lastly, the windows-based install of the at least one prescribed software package is initiated in response to the hook, the windows-based install being carried out according to the corresponding software package installer.

The embodiments of the present disclosure advantageously provide for generation of more robust software application package installs in the build-to-order manufacturing process and provide for faster factory install development, wherein one install is applicable for multiple platforms and languages.

BRIEF DESCRIPTION OF THE DRAWING FIGURES

The foregoing and other teachings and advantages of the present invention will become more apparent upon a detailed description of the best mode for carrying out the invention as rendered below. In the description to follow, reference will be made to the accompanying drawings, in which.

DETAILED DESCRIPTION

Figure 2:
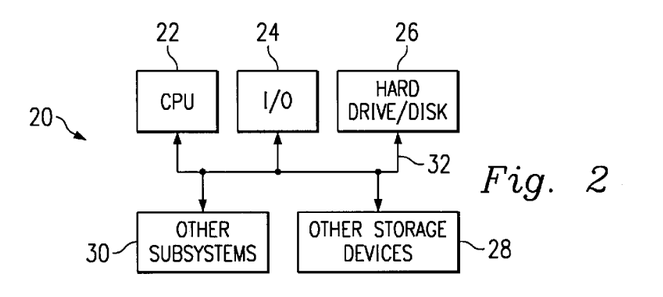
FIG. 2 is a block diagram view of an exemplary personal computer system.

Referring briefly to FIG. 2, a system block diagram of a computer system 20 is shown having features thereof configured in accordance a customer configured computer system order and manufactured in accordance with a build-to-order process as discussed herein. The computer system 20 includes a central processing unit (CPU) 22, input/output (I/O) devices, such as a display, a keyboard, a mouse, and associated controllers, collectively designated by a reference numeral 24, a hard disk drive 26, and other storage devices, such as a may include a floppy disk drive, CD-rom drive, and the like, collectively designated by a reference numeral 28, and various other subsystems, such as a network interface card (or NIC), collectively designated by a reference numeral 30, all interconnected via one or more buses, shown collectively in FIG. 2 as a bus 32.

Windows based installation (WBI) provides a way to run multiple vendor application installs within the build-to-order manufacturing process of custom configured computer systems. The present embodiments leverage a vendor's installation software, the vendor's installation software being designed to run only on a completely installed operating system, to detect the platform on which the given software is being installed, and to handle the dynamics of various complexities associated with multiple possible custom computer system configurations being manufactured in the build-to-order manufacturing environment.

WBI keeps a list of all installations (i.e., vendor installation programs) to run for a given custom configured computer system. Each vendor installation program is called sequentially by a WBI engine. WBI uses this synchronous environment to continuously engage detached processes and uses their respective inherent logic, providing the capability to run the vendor specific installation software within the custom configured computer system manufacturing process. Hence, by using WBI to initiate vendor installation software installations, most needs for reverse engineering in connection with installation of vendor software in the build-to-order manufacturing process are circumvented.

An immediate advantage of the WBI procedure is shorter time-to-market duration, wherein a single installation can be used across multipe operating system platforms. Also, for international software, an install can determine the language of the target operating system and thereby ensure installation of the proper language support. Additional advantages include error recovery, error handling, leveraged installation decision logic, improved configuration compatibility, a reduction of "missing and wrong" errors, reduced factory install development, and reduced factory installation testing cycles.

WBI thus utilizes third party software install programs to install corresponding third party software onto a computer system in the build-to-order manufacturing process. The third party software installers are advantageously incorporated into the build-to-order manufacturing process.

A temporary source directory is placed on the hard disk drive for use during software package installations. Upon completion of the software package installations, the temporary source directory is deleted from the hard drive. Prior to WBI, there did not exist a way to drive the third party vendors' install routines in an automated fashion. WBI thus captures changes and applies the third party vendors' install routines in an automated fashion.

OS setup can be carried out at the factory or at the customer site. Whether at the factory or at the customer site, no CD ROM or diskette media are required for loading and installing third party vendor software packages ordered with a custom configured computer system in the build-to-order manufacturing process. The present embodiments render the process of loading and installing third party vendor software packages an automated process making full use of the software package install routines. OS setup and software install can be automatically executed without user intervention as may be desired. The present embodiments eliminate the reverse engineering aspects of installing third party vendor software packages in an automated manner during build-to-order manufacturing of a custom configured computer system.

Figure 3:
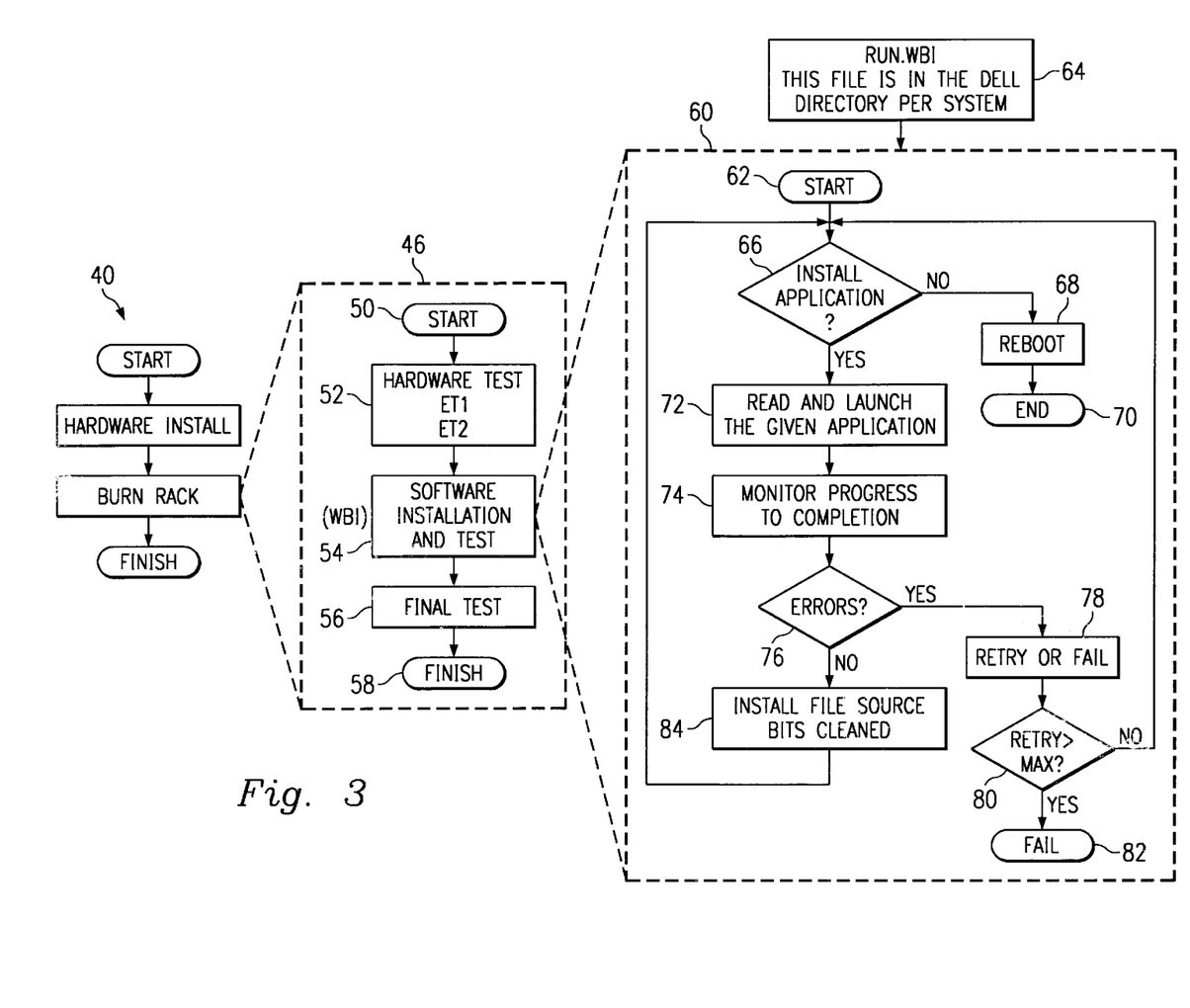
FIG. 3 is a flow diagram view of an embodiment of the present disclosure.

WBI utilizes the vendor install, connected into the build-to-order operating system setup process, and is seamless with little or no user intervention required for carrying out an automated third party software application install in the build-to-order manufacturing process. WBI runs a vendor install setup program without the need to reverse engineer the vendor installation program. The bits of the vendor installation program are downloaded onto the hard disk drive of the target system during the software download process portion of the build-to-order manufacturing process. The WBI engine code is included within the manufacturing process code used for carrying out the various steps in the manufacture of a particular custom configured computer system. The manufacturing process code may reside on a network server which is coupled to the target computer system via a suitable network interface. The manufacturing process code may also be local to the target system, that is, reside on the target system hard disk drive or on a removable storage media inserted into a corresponding media device (e.g., diskette drive, CD-Rom drive, or other media drive). Referring now to FIG. 3, the present embodiment shall be described with respect to the build-to-order manufacturing process in further detail. The build-to-order manufacturing process 40 begins with a customer order at step 42. The hardware ordered per the customer order is installed in step 44. The computer system having the appropriate hardware installed therein is then advanced to the burn rack. While at the burn rack, in step 46, the hardware is tested and software is downloaded onto the target computer system. Subsequent to processing in the burn rack, the custom configured computer system is removed from the burn rack, and provided the system successfully completed the burn rack processing, the computer system is packaged and shipped to the customer. The process finishes at step 48. In further discussion of the burn rack 46, the burn rack facilitates prescribed processing which begins at step 50. Step 52 includes hardware testing, for example, an extended test 1 (ET1) and an extended test 2 (ET2). Subsequent to hardware testing 52, the custom configured target system undergoes software download, installation, and test in step 54. The target system may then be further tested as needed in step 56 as a final test. The burn rack processing ends at step 58. According to one embodiment, WBI 60 of the present disclosure is carried out during software installation and test step 54. Referring still to FIG. 3, one embodiment of the WBI installation process 60 shall now be discussed, beginning at step 62. During WBI, the control file RUN.WBI 64 is read one line at a time, from top to bottom. In step 66, an inquiry is made as to whether or not any applications are to be installed. The number of lines of RUN.WBI 64 is indicative of the number of install applications to launch. That is, each line represents an install application to launch.

If no lines remain, then the third party software package installation(s) is(are) complete. When the installations are complete, the computer system is rebooted at step 68 for prescribed changes, resulting from the software installations, to take effect. The WBI process then ends at step 70.

If in step 66 there is an application to be installed, as indicated by the presence of a line reference to a given software package install application, then WBI proceeds to step 72. In step 72, the installer for the given application is read and launched. The progress of the launched installer is monitored to completion in step 74. WBI is a synchronous process in that each install must be completed before a next install is started. Monitoring of a launched installer's progress can be carried out in any suitable manner, for example, as per suitable instructions contained in the WBI program code.

In step 76, an inquiry is made as to whether or not any errors occurred during the given installation. If errors occurred, the WBI process then advances to a next step 78 which includes a retry or fail decision step. With WBI, the given application installation will be retried for up to a maximum number of times before a determination is made to fail the target system. In step 80, an inquiry is made whether or not the number of retries is greater than the maximum allowable number. If yes, then the particular computer system being manufactured is failed in step 82. Failure of a computer system typically requires some form of remedial action by a qualified service technician, or the presentation and/or display of suitable instructions to the computer user that service is required. An appropriate action is then taken, for example, if in the factory, the target system is removed from the burn rack and delivered to a service technician or technical support for repair. If in step 80 the number of retries is not greater than the maximum number, then the process proceeds back to step 66. The installation is again launched.

In step 76, if no errors have occurred during the installation, then the process proceeds to step 84. In step 84, the install file source bits used in connection with the application, which installed without errors, are cleaned from the hard disk drive of the target system. Once an application has successfully installed, then the install file source bits are no longer needed on the target system. Subsequent to step 84, the WBI process proceeds back to step 66 and repeats the subsequent steps, as indicated and discussed above.

Figure 4:
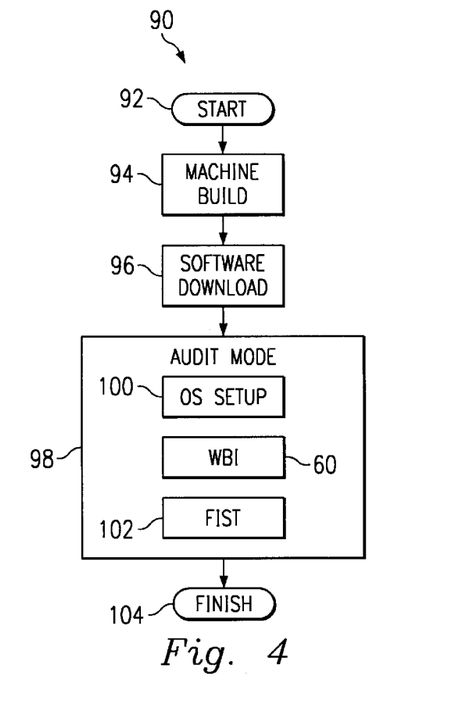
FIG. 4 is flow diagram view of another embodiment of the present disclosure.
Figure 5:
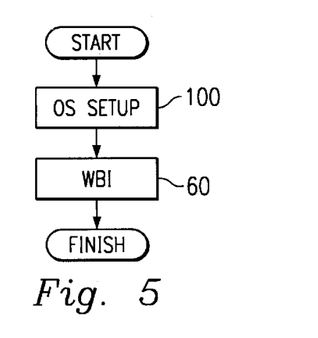
FIG. 5 is a flow diagram view of the windows-based install according to one embodiment of the present disclosure.

With reference now to FIG. 4, in another embodiment, a build-to-order manufacturing process 90 includes the following steps, starting at step 92. Hardware components are installed onto a target computer system in step 94. In step 96, software, as per the customer order, is downloaded onto the target system. In step 98, an audit mode is entered into. The audit mode includes an OS setup 100, WBI 60, and a prescribed fully integrated system test (FIST) 102. OS setup is run in order to render the operating system of the target computer functional. WBI 60 is carried out for the installing of prescribed vendor software packages as per the customer order. The manufacturing process 90 ends at step 104. In the manufacturing process 90 of FIG. 4, WBI is executed in the factory. During the manufacturing process, software is downloaded onto the target system as discussed. The manufacturing process can go into an OS setup 100 (FIG. 5). Subsequent to OS setup 100, WBI 60 is executed for carrying out the installation of prescribed vendor installation programs as per the custom configured computer system customer order. The illustration of FIG. 5 can occur at the factory or at the customer site.

The present WBI embodiments advantageously allow for the use of vendor install logic during a corresponding vendor software package installation in the build-to-order manufacturing process. That is, vendor install programs or routines typically include logic therein for making decisions, according to vendor prescribed criteria, during an installation of the vendor software package. For example, a vendor software package (e.g., Microsoft Office 97) may include an installation setup routine which includes logic for determining whether the target computer system is running Windows 95, Windows 98, or Windows NT. The installation logic can handle any operating system specific requirements without user intervention. In addition, logic for preventing the overwriting of older files with newer files, with respect to shared resources between vendor software applications, during an installation can be utilized if available. WBI of the present embodiments thus can advantageously utilize any available logic of a corresponding vendor software package install.

The present WBI embodiments create a WBI engine and system around several commercially available installers, with knowledge about the installers, to launch all of the windows-based installer applications off, and to verify that they do what they are supposed to do. Windows-based installer type technologies and applications are commercially available. Examples of windows-based installer type technologies include InstallShield available from InstallShield Software Corporation of Schaumburg, Ill. and Microsoft Install (MSI) and ACME, the later being available from Microsoft Corporation of Redmond, Wash. The installer applications are used by third party software vendors to create installable packages for vendor software. Success or failure of a vendor software installation can also be readily determined with WBI of the present embodiments, in contrast to the blind install of the forced, reverse engineered, install method.

Figure 6:
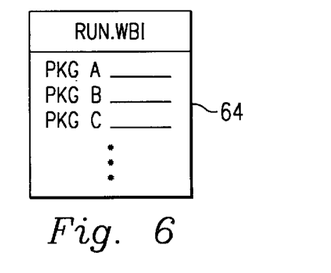
FIG. 6 is an illustrative view of a RUN.WBI control text file according to one embodiment of the present disclosure.

WBI of the present disclosure is an infrastructure which allows third party vendor software installers to operate within the automated build-to-order manufacturing process. Wherever bits are downloaded onto the hard disk drive of a target system for a third party software application package, the package plugs itself into WBI by adding a line to the WBI control file RUN.WBI. RUN.WBI is a text file, where each line thereof represents an installer to be run during the software installation portion of the build-to-order manufacturing process for a given custom configured computer system. The RUN.WBI file includes as many lines as there are third party software package installers to be launched, further in accordance with the custom configured software and hardware per a given customer order. See FIG. 6, for example.

RUN.WBI 64 is a text file on the DELL directory on the hard disk drive of a computer system being manufactured. There is one RUN.WBI per custom configured computer system per each customer order. For example, if a customer placed an order for a custom configured computer system which included a given operating system and software packages A, B, and C (See FIG. 6), then RUN.WBI 64 would include three lines, one each for each software package ordered. For each, the third party software contents are packaged up and placed on the target computer system hard disk drive. In addition, an entry corresponding to the particular software package is entered into the RUN.WBI file, such that, the corresponding software package installation is carried out as discussed above during the WBI software install.

Each custom configured computer system to be manufactured will have a RUN.WBI file associated therewith. The RUN.WBI file gets generated or created based upon information obtained via the order entry system of the build-to-order manufacturing process.

WBI of the present disclosure is an engine or process. With respect to the present embodiments, on the development side, a WBI executable application is written to utilize the WBI functionality. Part of that development is to create a line which indicates where a give third party software package setup program is and where the corresponding source bits are. The corresponding setup program is launched at the appropriate time to effect the installation of the source bits of the third party software package on the target system. With a WBI install of the present disclosure, source bits are placed on the target system hard disk drive and the third party software's install program is registered to be executed during the WBI portion of the software install.

In continuation of the example described above, beginning with the customer order, the manufacturing network server knows that it wants software package applications A, B, and C for installation onto the target system. Applications A, B; and C each have a script file associated with them to get themselves downloaded onto the target system. In addition, the script file for each includes instructions to get the respective application set up so that some way or another, the application gets itself installed. The network server calls and runs scripts A, B, and C because the server wants software applications A, B, and C. Script A knows that it is specific to application A and that script A wants to utilize WBI. Script A tells WBI that WBI has to run script A, that application A source bits are in a particular directory or location on the target system hard drive, and whatever other modification or modifications script A wants to make in connection with the installation of application A on the target system. Script files are manually created for each third party software package offered as an option by the build-to-order computer manufacturer.

As discussed, RUN.WBI is a control file containing a list of applications to be installed on a given target system using the respective application's setup program. The build-to-order manufacturing process is greatly improved with WBI installation of third party software packages.

WBI Features List

Features for Windows Based Installation according to the present disclosure include the following (presented in no particular order). WBI supports running installations synchronously (i.e., sequentially, including detached processes). WBI reads installation instructions from a control file RUN.WBI. The control file may be stored in a prescribed directory on the hard drive of the target system, for example, at C:\DELL\RUN.WBI. As discussed herein, the control file RUN.WBI contains one line per application install, including command line arguments.

In addition to the above, the present embodiments of WBI support various types of windows based installations. The various types of windows based installations may include, for example, InstallShield based installations (version 5.0 or later), ACME based installations (i.e., Office 9x), and MSI based installations (i.e., Office 2000). The present embodiments of WBI also provides adequate user feedback during installation such that the target system is not perceived by a user as being in a hung state. The present embodiments are also designed to handle error codes properly, including the support of timeouts to determine if installations are still running or hung. Furthermore, the WBI embodiments are fault tolerant and persistent between reboots.

The embodiments of the present disclosure also include clean up of respective application install files upon each successful installation. The WBI embodiments are further designed to support plug-in modules for handling new install types. This will allow for easier integration of new installation types and will reduce the need for regression of existing packages. In a preferred embodiment, WBI must suppress all reboots until all third party vendor software packages or applications have been installed.

A benefit of WBI is that, in the case of software installation at the customer site, customer calls to the manufacturer's technical support are significantly reduced or minimized in connection with the third party software package installation on a target system.

One of the features of WBI is that WBI support plug-in modules for handling new install types. This allows for easier integration of new installation types and reduces the need for regression of existing packages. The purpose of this feature/requirement is to enable updates to the Windows Based Installation engine without affecting the existing product in a way that would cause the need for regression testing. The plug-in modules are developed without changing any of the base WBI code by using plug-in dynamic link library (DLL) modules as wrappers for interfacing with the different installation types.

C++ Objects are used in WBI to implement the wrappers. The virtual base class CWrapper is the starting point for all new wrappers, as defined in Wrapper.h below.

```
// Wrapper.h
//
// Definition for abstract CWrapper base class. All wrapper
// items are derived from this class. This class is never used
// directly ifndef _WRAPPER_H_
define _WRAPPER_H_ class CWrapper
{
protected:
    // CTor is protected so that public creation
    // of this object is not allowed
    //
    CWrapper() {};

virtual BOOL LaunchAndWait(CString strCmdLine);

public:
    // methods
    //
    virtual BOOL PreInstallApplication()=0;
    virtual BOOL InstallApplication(CString strCmdLine)=0;
    virtual BOOL PostinstallApplication()=0;
    virtual BOOL CleanupInstallationFiles(CString strInstailDir)=0;
};

#endif // _WRAPPER_H_
```

This CWrapper class is never instantiated directly. Rather, it is used as a generic base class defining what a wrapper looks like. This enables a ControlManager to instantiate and manipulate the individual wrappers without any knowledge of which particular wrapper is being used. This is a key point because this design feature is what allows new wrappers to be written without any need to recompile or update the base WBI engine. As long as all new wrappers are defined based on the CWrapper class, then they will look and behave like a CWrapper object. Since WBI can handle CWrapper objects and behavior, it can thus handle any new wrappers that are developed. This is a good use of C++ polymorphism. In object technology, instantiate means to create an object of a specific class. Instantiated refers to an actual "instance" of an object as opposed to the description of an object.

The next issue to resolve is how to create wrapper objects. A new operator cannot simply be used since the class definitions are contained inside dynamic link libraries or DLLs. WBI needs a way to load the appropriate wrapper DLL into its address space and then instantiate the appropriate object. Each wrapper DLL will export a well known function named CreateWrapperlnstance(...). This function will return a CWrapper pointer and will be the first function called by the WBI engine after the DLL is loaded. This function is declared in WrapperDLL.h and is included in WBI and must be included by every WBI wrapper project.

```
// WrapperDLL.h
//
// Common header for all WBI wrapper DLLS. Header
// defines common export(s) and also declares
// useful typedefs etc.

#ifndef _WRAPPERDLL_H_
define _WRAPPERDLL_H_ include "Wrapper.h"

// Defines, TypeDefs
//
#define DLLEXPORT _declspec(dllexport)
typedef CWrapper* (* CREATE_WRAPPER_INSTANCE_PTR)();
typedef void (* DESTROY_WRAPPER_INSTANCE_PTR)();

// Exports
//
DLLEXPORT CWrapper* CreateWrapperlnstance();
DLLEXPORT void DestroyWrapperlnstance();

#endif // _WRAPPERDLL_H_
```

Now all that is needed is code to load the appropriate wrapper and then call the two exports listed above to create and destroy wrapper objects. That is the purpose of the following functions located in ControlManager.cpp:

```
//==============================================
// Function: LoadWrapperAndCreateInstance
// Parameters: Wrapper filename
// Returns: pointer to a wrapper object
// Purpose: Loads the specified wrapper and calls the wrap-
//     pers exported CreateWrapperlnstance() function.
// LoadWrapperAndCreateInstance
// caches the wrapper DLLs and only loads a wrapper if it is
//     not
// currently loaded.
CWrapper*
    CControlManager::LoadwrapperAndCreateInstance
    (CString strWrapperName)
{
    // Add DLL loading code here
    //

// PseudoCode
    //
    // Walk global list of wrappers
```

```
// If wrapper found in list then use its function ptrs to
    create new object
// If wrapper not found in list then
// Check that 'DLL' is appended to end of wrapper name
// Attempt to load DLL (return NULL on fail)
// Map pointers to wrappers exported functions
// Create new WrapperDLLStruct object and fill in its
    values
// Add new structure to end of global wrapper list
// Use newly mapped function pointers to create an
    appropriate wrapper object
// End return NULL;
}

//================================================
// Function: DestroyWrapperInstance
// Parameters: Wrapper filename
// Pointer to wrapper object to destroy
// Returns: void
// Purpose: Looks for the passed wrapper name in the global
    wrapper list and
// when found uses its DestroyWrapperInstancePtr to call the
    appropriate wrapper deletion routine. The pWrapper
    parameter is passed directly to the wrapper DLL. The
    wrapper is not removed from memory!
void  CControlManager::DestroyWrapperInstance(CString
    strWrapperName, CWrapper* pWrapper)
{
    // Add WrapperInstance deletion code here
    //

// PseudoCode
    //
    // Check that 'DLL' is appended to the end of strWrap-
        perName
    // Walk global list of wrappers
    // When wrapper is found call DestroyWrapperInstance
        (..) pointer function pass in pWrapper to be destroyed
    // Return
}

//================================================
// Function: UnloadWrappers
// Parameters: None
// Returns: void
// Purpose: Walks the global list of wrapper DLLs and
    removes them in turn from memory. void CControlMan-
    ager::Unload Wrappers()
{
    // Add UnloadWrappers code here
    //

// PseudoCode
    //
    // While more wrappers in list
    // Get next wrapper
    // delete wrapper
    // End
    //
    // Return
```

}

The above function should be self-explanatory. Suitable code is used to put it all together using coding techniques known in the art. Following is the pseudo code for CControlManager::InstalLApplications():

```
// PseudoCode
//
// Check for any entries in run.wbi that have 'Start' entry but
    no 'Stop'
//
// While more entries in run.wbi
// Read in new entry
// Call LoadWrapperAndCreateInstance()
// Call pWrapper->PreInstallApplication()
// Call pWrapper->InstallApplication()
// Call pWrapper->PostInstallApplication()
// if InstalLApplication successful
// Call pWrapper->CleanupInstallationFiles()
// End
//
// Call DestroyWrapperInstance()
// End
//
// Call UnloadWrappers()
//
// Return
```

Notice that for performance reasons, the DLL wrappers are cached in memory. In this way, the DLL is loaded only once and multiple wrapper objects can be created from its functions. The wrappers are unloaded only after all entries have been processed from RUN.WBI.

Another feature is that WBI is to support running installations synchronously, including detached processes. This is to ensure that each installation runs successfully without any interruptions from other running processes. One example might include where 'WBI' calls 'Setup' and attempts and waits for the task to complete. 'Setup' almost immediately calls 'ACMESetup'. When this call is made, 'Setup' makes no attempt to monitor the new process. Instead it creates the process starting it on its way and then forgets about it. Worse yet, 'Setup' then returns to 'WBI' signaling that it is complete. At this point, WBI has no generic way of determining if any related processes are still running. There are two options for solving this problem. The second will be the preferred method but the first could still be useful for certain types of installs (i.e., for an ACME setup).

In a first option, since individual wrappers are created for each installation type, it would be possible to create specific checks for specific processes running pertinent to each particular type. For example, in the example above, the ACME Setup wrapper could look for "ACMESetup.exe" by name and if found continue to wait until that process has completed running. It could do the same for any other sub processes specific to ACME based installations.

Another option is to go back to the vendors. InstallShield works similarly to the ACME Setup example above (i.e., sub processes are launched from setup). The only difference is the name of the other processes that are launched. Having recognized that people would want to be able to programmatically wait for installations to complete, InstallShield added the "-SMS" command line parameter. This command line parameter tells the main InstallShield setup.exe to remain running until all subprocesses that it launched are complete. Office 2000, which is MSI based, has a similar "/wait" parameter.

With respect to the feature that WBI of the present disclosure must read items to execute from C:\DELL\RUN.WBI, the following design provides one implementation. The design involves a requirement that information describing all installations to run will be contained in the C:\DELL\RUN.WBI file. In connection therewith, there is one comma-delimited line per software package application. The first part of the line before the comma will specify the wrapper file name to be executed. The information following the wrapper file name and up to the next comma represents the setup command line and will be passed as-is to the specified wrapper once loaded. Following the command line data, up until the next comma, is the cleanup directory. If specified, the directory and all the contents contained within will be deleted once the installation is completed successfully. The next value specifies the timeout for the respective install in units of seconds (or other suitable units). For example, a default timeout may be on the order of fifteen minutes (i.e., 900 seconds) per entry before failing. The last parameter, continuing up to a newline/linefeed pair, is whether this install requires an immediate reboot before continuing. A 'reboot' will cause WBI to stop execution, perform a reboot, and then continue with any remaining installs. With respect to the RUN.WBI file design, all parameters which are enclosed in brackets are optional and can be omitted.

Example entries include the following:

```
Wrapper, CmdLine, [CleanupDir], [TimeoutSeconds], [Reboot]
   WBIAcme.dll, c:\dell\12345\setup.exe -parameters -more
   parameters -etc . . . , c:\dell\12345
```

The wrapper filename is the full name of a DLL that is in the C:\DELL\WBI directory. If the wrapper is unable to be located, then the WBI install program should log an error and continue on with any remaining steps to execute.

The present embodiments of WBI are designed to support various types of windows base installations. The various types of windows based installations may include, for example, InstallShield based installations (version 5.0 or later), ACME based installations (i.e., Office 9x), and MSI based installations (i.e.,Office 2000).

InstallShield Based Installations

In one design, a wrapper is written to handle InstallShield installations. The InstallShield wrapper is named WBIIS50.DLL and exports functions as follows (NOTE: these will be defined in WrapperDLL.h which should be included by all wrapper implementations):
Exports
   DLLEXPORT CWrapper* CreateWrapperInstance();
   DLLEXPORT void DestroyWrapperInstance (CWrapper*);

Waiting for an installation to complete can be accomplished with the following. Since several installations including InstallShield involve multiple executables, it can be difficult to programmatically wait for an installation to complete. In addition to the method mentioned above in the Running Application Synchronously feature, InstallShield provides a switch to make the main SETUP.EXE wait, so that it can be waited on for completion.

Passing the parameter -SMS on the command line to an InstallShield setup program will cause the setup program to continue running until the setup is complete. The InstallShield wrapper DLL InstalLApplication(...) function should check if this switch has already been specified (i.e., passed) in command line and if not, append the switch to the command line. The -SMS switch allows WBI to wait for the setup to complete by using the WaitForSingleObject(...) Win32 API function. Combining this with the other method for waiting for multiple detached processes will ensure that WBI waits until a given InstallShield application is installed completely.

With respect to cleanup, if and only if the installation is completed successfully (i.e. InstallApplication(...) returns TRUE), then the ControLManager calls the wrapper CleanupInstallationFiles(...). This function is responsible for deleting all of the installation files from the hard drive of the target system under the installation source directory. Recall that the installation source directory is passed in from the ControlManager. The ControlManager obtains the prescribed source directory from the C:\DELL\RUN.WBI file where it was specified.

An example RUN.WBI entry for an InstallShield based installation may include: "WBII5.DLL, C:\DELL\12345\SETUP.EXE -SMS,C:\DELL\12345". It is a further requirement of WBI for the installation files of individual applications to be contained under one directory tree per application. Thus, the general implementation of CleanuplnstallationFiles(...) will involve recursively deleting all of the files under the specified cleanup directory. In addition, any custom cleanup that might be needed for a particular install type can be done at this point in the WBI process.

ACME Based Installations

In another design, a wrapper is written to support ACME based installations (i.e. Office 97/98 etc.). ACME is the installation engine currently used by many Microsoft products, however, use of this engine is expected to diminish as MSI becomes more widely used. The ACME wrapper is named WBIACME.DLL and exports functions similarly as stated above with reference to the InstallShield based installations.

Waiting for an installation to complete can be accomplished with the following. Since ACME based installs involve multiple executables and the main SETUP.exe does not provide any wait mechanism that is analogous to the -SMS or /WAIT switches provided by InstallShield or MSI, respectively, a different method must be used to wait for ACME installations to complete. The ACME wrapper will contain a list (array) of known executables that are related to ACME based installations. When the main setup.exe returns, the ACME wrapper will then begin searching all running tasks for any that match the known list. If an application is found and is running, then the wrapper will wait for it to complete. The above steps will continue until no more known executables related to the install are running.

Cleanup for an ACME based installation is similar to that discussed above with respect to the InstallShield based installation cleanup.

An example RUN.WBI entry for an ACME based installation may include: "WBIACME.DLL, C:\DELL\12345\SETUP.EXE,C:\DELL\12345". As mentioned above, it is a requirement of WBI for the installation files of individual applications to be contained under one directory tree per application. Thus, the general implementation of CleanupInstallationFiles(...) will involve recursively deleting all of the files under the specified cleanup directory. In addition, any custom cleanup that might be needed for a particular install type can be done at this point in the WBI process.

MSI Based Installations

In another design, a wrapper is written to handle MSI based installations. The MSI wrapper is named WBIMSI.DLL and will export functions similarly as stated above with reference to the InstallShield based and ACME based installations.

Waiting for an installation to complete can be accomplished, for example, as discussed in the following. Office 2000, which is MSI based, provides a /WAIT parameter that is analogous to the -SMS switch provided by InstallShield. By passing the /WAIT on the command line to a WBI setup program, the /WAIT parameter will cause the WBI setup program to continue running until the setup is complete. The /WAIT key, however, is specific to the Office 2000 install and not part of the base functionality of MSI. A preferred method of launching an MSI based install is via the package which actually defines the install. By passing the package file to the MSI engine (MSIEXEC.EXE), the install can be launched in a prescribed way such that the WBI process can easily wait for the install to complete.

Cleanup for an MSI based installation is similar to that discussed above with respect to the InstallShield and ACME based installation cleanup.

An example RUN.WBI entry for an MSI based installation may include: "WBIMSI.DLL, C:\DELL\12345\INSTALL.MSI,C:\DELL\12345". As mentioned above, it is a requirement of WBI for the installation files of individual applications to be contained under one directory tree per application. Thus, the general implementation of CleanupInstallationFiles(...) will involve recursively deleting all of the files under the specified cleanup directory. In addition, any custom cleanup that might be needed for a particular install type can be done at this point in the WBI process.

To provide a feature for adequate user feedback during an installation, such that the user will not think that the system is hung, the following can be implemented. The interface for WBI contains a status bar that updates installation status during the installation. This interface is sufficient for providing feedback when it is updated frequently. The status bar can be updated each time a task is completed. By taking the total number of tasks and dividing up the status bar into that many pieces, a progress meter (i.e., status meter) is provided that updates from 0 to 100 percent correctly. Application installations, however, may take anywhere from a few seconds to several minutes, and thus it can be some time before the progress meter updates. This could cause the user to mistakenly think that their computer is hung and not responding. One option would be to update the progress bar more frequently (i.e. not at the task level, but at the sub task level). Installations may also be run without any knowledge of their size or the time it will take for each to complete. In such instances, there exists no real way of dividing up the progress bar of the meter properly, nor of knowing how frequently to perform updates. In the later instance, a suitable message or other indication can be added to the dialog of the progress meter which indicates that the computer is still working. For instance, a series of dots going across the screen can be updated more frequently than the progress bar. The series of dots do not need to be tied in any way to a particular completion point in the install and would update based on a preset timer. When a edge of the dialog box is reached, the dot line could be started over again, beginning from an opposite side of the dialog box.

All changes are contained in WBIDlg.CPP and .H files. Since WBI is a global application that runs on multiple languages, the dialogs size is not fixed and can be computed at runtime.

Another feature of WBI of the present disclosure is that it handle error codes in a robust manner. To do so, it is up to the individual wrappers to detect errors in the individual installs. If an error is encountered, then the error will be reported back to the Control Manager. When the Control Manager receives an error, it can skip the deletion of the particular application installation files and record that an error has occurred in a member variable (e.g., m_bErrorsEncountered). Thereafter, the Control Manager can continue on with any remaining installations.

According to one embodiment, once all work has been completed and if errors were encountered, WBI will display a restart dialog and then reboot the computer system. It will not remove itself from the registry. When the computer system comes back up, WBI will run again one more time to retry an application that had errors. If all is successful, then WBI proceeds with a final cleanup. If errors are encountered again, then the following steps can occur: i) Write an error entry to the end of line for failed application in C:\DELL\RUN.WBI; ii) cleanup failed installations files; and iii) cleanup core WBI files and remove WBI from registry.

Yet another feature of the present embodiments is that the WBI be fault tolerant and persistent between reboots. In one embodiment, WBI does not delete any installation files until an installation has been completed successfully. If WBI is interrupted during execution, it will automatically restart at the installation that was previously executing when the computer system reboots. In this manner, those installations that have already completed will not be needlessly rerun. It is up to the individual installation packages to properly handle re-installation of a partially installed application.

When WBI begins execution of a new task, it will first write out the start time (e.g., in 24-hour format) to the end of the current line in the C:\DELL\RUN.WBI file, separated from the rest of the line by a comma.

EXAMPLE

RUN.WBI File
WBIACME.DLL, C:\DELL\12345\SETUP.EXE /U:USER /O:ORG -Q,C:\DELL\12345, START 2:45

In a similar fashion, when the task is complete and before going to the next one, WBI will write out the comma delimited completion time (e.g., in 24-hour format) to the end of the current line in C:\DELL\RUN.WBI.

EXAMPLE

RUN.WBI File
WBIACME.DLL, C:\DELL\12345\SETUP.EXE /U:USER /O: ORG -Q,C:\DELL\12345, START 2:45:41, STOP 2:47:04

In addition, when the cleanup of the installation's source files is complete, WBI will write out the comma delimited cleanup completion time (e.g., in 24-hour format) to the end of the current line in C:\DELL\RUN.WBI.

EXAMPLE

RUN.WBI File
WBIACME.DLL, C:\DELL\12345\SETUP.EXE /U: USER /O:ORG -Q,C:\DELL\12345, START 2:45:41, STOP 2:47:04, CLEAN 2:47:39

In one embodiment, a START time may be provided on the first line. If one is found, WBI will then check for a STOP time on the same line. If a STOP time exists, WBI will then check for a CLEAN on the line. If a CLEAN time is found, then WBI will continue searching RUN.WBI for a subsequent line. If a line is found that contains a START time but no STOP time, then WBI will start at that line and continue the installation. If a line is found with a STOP, but no CLEAN, then WBI will start at that point by performing the cleanup for that particular line. If there is not a START entry on the first line, then execution will continue from the beginning. This later case will usually indicate the first time the WBI application has been run.

Yet another feature, briefly mentioned herein above, is that WBI clean up installation files upon successful installation. If, and only if, the installation is completed successfully (i.e. InstallApplication(...) returns TRUE), then the ControlManager should call the wrappers CleanupInstallationFiles(...). This function will be responsible for deleting all of the installation files from the hard drive under the installation source directory. The installation source directory will be passed in from the ControlManager. The ControlManager will obtain the source directory from the C:\DELL\RUN.WBI file where it was specified.

EXAMPLE

RUN.WBI Entry
WBIIS5.DLL,C:\DELL\12345\SETUP.EXE -SMS, C:\DELL\12345

Another feature of the present embodiments is that WBI suppress all reboots until all application files have been installed. It is a further feature of WBI that all installations have an option to suppress any forced reboots. Each installation wrapper will know what this is and should check if the option is specified properly in the RUN.WBI file. If it is not, the appropriate option should be appended. For example, with the Office 97 based ACME Setup, the proper command line switch to disable the forced reboot is "/qnt". In this case, the ACME Setup WBI wrapper should always check if the developer has specified that command line option and if not, append it to the command line before launching the setup. In this manner, the developers work is double checked and any unexpected reboots during the set of installations that WBI is performing are prevented.

Once all WBI based applications have been successfully installed and their installation files removed from the system, WBI will reboot the machine. In one embodiment, WBI will reboot the machine after displaying a suitable dialog to the user. For instance, the dialog may include the message: "Setup completed successfully. You must restart your computer before the new settings will take effect. Setup will restart your computer in 10 seconds." In addition, the dialog may also include a Restart button. The seconds will countdown to zero and once reached will automatically restart the machine. If the Restart button is clicked prior to the countdown reaching zero, then the computer will be restarted immediately.

In another embodiment, WBI is designed to be able to recognize when it is running under a full silent mode install, such as a fully integrated system test (FIST), in the factory. This mode will disable any reboots or wait dialogs (i.e. dialogs that require user intervention before continuing). When enabled, there is to be no automatic reboot of the system at the end of an install. Status dialog(s) may be provided. When WBI is running in the factory, it is undesirable to have any parts of the setup require user intervention. For this reason, WBI must be capable of recognizing when it is running under this environment and act accordingly.

The fully integrated system test (FIST) includes a step engine (a.k.a. DDT) that drives the FIST process. The first entry that DDT tries to execute is WBI check (WBICheck). The WBICheck process checks to see if WBI is in the registry. If so, WBICheck blocks the FIST process from continuing until a 'WBI.DUN' flagfile is written indicating that WBI is complete. When WBI loads, it performs its installation tasks. Once these are completed successfully, WBI removes its entry from the registry 'RUN' key and writes a file out to the C:\DELL directory. The file is named WBI.DUN. This signals to WBICheck that WBI is complete and thus should be the last thing done by WBI.

As discussed herein, WBI provides for more robust installs in a custom configured computer system build-to-order manufacturing process. WBI further provides for faster factory install development, wherein one install is applicable for use across multiple platforms and languages. WBI is designed for installation of third party software package applications in a build-to-order manufacturing process, further in which drivers are installed via information files or INFs.

With the present embodiments, WBI registration parameters are used and include Wrappers, CleanDir, ComLine, Timeout, and Reboot. The Wrapper parameter provides a WBI wrapper description and may include a value such as IS50, ACME, and MSI. The parameter CleanDir is an optional parameter. CleanDir specifies the directory to be deleted after successful installation. All contents under ClearDir are deleted recursively. If not specified, then no deletion occurs. Values for the ClearDir parameter depends upon the install and can be expressed as C:\\DELL \\PARTNUM. ComLine is the complete command line to execute the specific install. Values of ComLine depend upon the install, however they should include a fully qualified path to the installation executable or install package. For example, C:\\DELL \\PARTNUM \\INSTALL.MSI or C:\\DELL \\PARTNUM \\SETUP.EXE -SMS -S are illustrative of an exemplary ComLine. Timeout is another optional parameter. Timeout specifies the time in seconds that WBI should wait on a given install before timing out and signaling an error. If omitted, the default of 15 minutes (900 seconds) is used. Values of Timeout depend on the install. Lastly, reboot specifies whether an immediate reboot of the system should occur after an install has competed. The parameter should only be used in rare cases where one install can cause other subsequent installs to fail if a reboot is not performed.

WBI core files can be stored in a C:\DELL \WBI directory. Software parts can be anywhere on the target system (most likely in C:\DELL \<partnum>). A WBI line is placed in a RUN key in the computer system registry, such that WBI runs automatically at first logon. After the download, installation lines are read from C:\DELL\RUN.WBI and executed in order. Once completed, the installation source files are deleted if CleanDir is specified. WBI removes a corresponding entry from the RUN key and deletes core files from C:\DELL\WBI directory. WBI then performs a final reboot after all installations are compete.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims. For instance, WBI may be configured in a prescribed manner to be able to update the installation location to an available CDROM drive or other storage media drive, as opposed to the temporary location installed from during WBI (e.g., as a scriptable function of the installation).

What is claimed is:

1. A method for automated installation of software packages in a computer system comprising:
   loading an operating system onto the computer system, the operating system having a hook for initiating a windows-based install of prescribed software packages during an operating system setup (OS setup);
   loading at least one prescribed software package and a corresponding windows-based software package installer onto the computer system;
   executing the operating system setup; and
   initiating the windows-based install of the at least one prescribed software package in response to the hook, the windows-based install being carried out according to the corresponding software package installer.

2. The method of claim 1, wherein the windows-based install includes:
A) an inquiry as to whether or not there is at least one software package to install, and
   i) if none, then ending the automated installation of software packages, otherwise,
   ii) if at least one, then
      a) reading and launching a first windows-based software package installer,
      b) monitoring progress of the windows-based software package installer to completion, and
      c) checking for any errors which may have occurred during the software package installation and
         c1) if no errors, then cleaning up the software package installer from the computer system and repeating the above beginning at A), and
         c2) if errors, then retrying the given windows-based software package installer up to a maximum number of times, beginning again at step A) and upon the number of retries exceeding the maximum number, failing the computer system.

3. The method of claim 1, wherein the at least one prescribed software package includes at least one software package as identified by a custom configured computer system customer order in a build-to-order manufacturing process.

4. The method of claim 1, wherein the at least one prescribed software package is resident on a hard disk drive of the computer system.

5. The method of claim 1, wherein the corresponding windows-based software package installer is resident on a storage media drive of the computer system.

6. The method of claim 1, wherein a RUN.WBI control file is loaded onto the computer system, the RUN.WBI control file including a listing of descriptions of the at least one prescribed software package to be installed and further being accessed during the windows-based install of the at least one prescribed software package.

7. The method of claim 6, wherein each line of the RUN.WBI control file is a description a software package to be installed.

8. The method of claim 7, wherein each description is a comma delimited line characterized by a wrapper filename to be executed, a setup command line to be passed to the wrapper once loaded, and option parameters, the optional parameters including a cleanup directory, a timeout parameter, and a reboot parameter.

9. The method of claim 8, wherein the wrapper filename is a full name of a dynamic link library (DLL) wrapper, the DLL wrapper for interfacing with a prescribed windows-based installation type.

10. The method of claim 9, wherein the DLL wrapper is cached in memory of the computer system.

11. The method of claim 9, wherein DLL wrapper to be executed is a C++ object.

12. A computer system equipped for automated installation of software packages comprising:
an operating system loaded onto the computer system, the operating system having a hook for initiating a windows-based install of prescribed software packages during an operating system setup (OS setup);
at least one prescribed software package and a corresponding windows-based software package installer loaded onto the computer system;
means for executing the operating system setup; and
means for initiating the windows-based install of the at least one prescribed software package in response to the hook, the windows-based install being carried out according to the corresponding software package installer.

13. The computer system of claim 12, wherein the windows-based install includes:
A) an inquiry as to whether or not there is at least one software package to install, and
   i) if none, then ending the automated installation of software packages, otherwise,
   ii) if at least one, then
      a) reading and launching a first windows-based software package installer,
      b) monitoring progress of the windows-based software package installer to completion, and
      c) checking for any errors which may have occurred during the software package installation and
         c1) if no errors, then cleaning up the software package installer from the computer system and repeating the above beginning at A), and
         c2) if errors, then retrying the given windows-based software package installer up to a maximum number of times, beginning again at step A) and upon the number of retries exceeding the maximum number, failing the computer system.

14. The computer system of claim 12, wherein the at least one prescribed software package includes at least one software package as identified by a custom configured computer system customer order in a build-to-order manufacturing process.

15. The computer system of claim 12, wherein the at least one prescribed software package is resident on a hard disk drive of the computer system.

16. The computer system of claim 12, wherein the corresponding windows-based software package installer is resident on a storage media drive of the computer system.

17. The computer system of claim 12, wherein a RUN.WBI control file is loaded onto the computer system, the RUN.WBI control file including a listing of descriptions of the at least one prescribed software package to be installed and further being accessed during the windows-based install of the at least one prescribed software package.

18. The computer system of claim 17, wherein each line of the RUN.WBI control file is a description a software package to be installed.

19. The computer system of claim 18, wherein each description is a comma delimited line characterized by a wrapper filename to be executed, a setup command line to be passed to the wrapper once loaded, and option parameters, the optional parameters including a cleanup directory, a timeout parameter, and a reboot parameter.

20. The computer system of claim 19, wherein the wrapper filename is a full name of a dynamic link library (DLL) wrapper, the DLL wrapper for interfacing with a prescribed windows-based installation type.

21. The computer system of claim 20, wherein the DLL wrapper is cached in memory of the computer system.

22. The computer system of claim 20, wherein DLL wrapper to be executed is a C++ object.

23. A build-to-order computer manufacturing process comprising:
obtaining a customer order specifying desired components for a custom configured computer system, the components to include at least hardware, software, and operating system;

assembling the hardware of the computer system as specified per the customer order;

testing the assembled hardware;

loading the operating system onto the computer system, the operating system having a hook for initiating a windows-based install of prescribed software packages during an operating system setup (OS setup);

loading at least one prescribed software package and a corresponding windows-based software package installer onto the computer system, the at least one prescribed software package as specified per the customer order;

executing the operating system setup; and initiating the windows-based install of the at least one prescribed software package in response to the hook, the windows-based install being carried out according to the corresponding software package installer.

24. The manufacturing process of claim 23, wherein the windows-based install includes:

A) an inquiry as to whether or not there is at least one software package to install, and
  i) if none, then ending the automated installation of software packages, otherwise,
  ii) if at least one, then
    a) reading and launching a first windows-based software package installer,
    b) monitoring progress of the windows-based software package installer to completion, and
    c) checking for any errors which may have occurred during the software package installation and
      c1) if no errors, then cleaning up the software package installer from the computer system and repeating the above beginning at A), and
      c2) if errors, then retrying the given windows-based software package installer up to a maximum number of times, beginning again at step A) and upon the number of retries exceeding the maximum number, failing the computer system.

25. The manufacturing process of claim 23, wherein the at least one prescribed software package is resident on a hard disk drive of the computer system.

26. The manufacturing process of claim 23, wherein the corresponding windows-based software package installer is resident on a storage media drive of the computer system.

27. The manufacturing process of claim 23, wherein a RUN.WBI control file is loaded onto the computer system, the RUN.WBI control file including a listing of descriptions of the at least one prescribed software package to be installed and further being accessed during the windows-based install of the at least one prescribed software package.

28. The manufacturing process of claim 27, wherein each line of the RUN.WBI control file is a description a software package to be installed, further wherein each description is a comma delimited line characterized by a wrapper filename to be executed, a setup command line to be passed to the wrapper once loaded, and option parameters, the optional parameters including a cleanup directory, a timeout parameter, and a reboot parameter.

29. The manufacturing process of claim 28, wherein the wrapper filename is a full name of a dynamic link library (DLL) wrapper, the DLL wrapper for interfacing with a prescribed windows-based installation type.

30. The manufacturing process of claim 29, wherein the DLL wrapper is cached in memory of the computer system.

31. A computer program stored on a computer-readable medium for execution by a computer system for automated installation of software packages in the computer system comprising:

instructions for loading an operating system onto the computer system, the operating system having a hook for initiating a windows-based install of prescribed software packages during an operating system setup (OS setup);

instructions for loading at least one prescribed software package and a corresponding windows-based software package installer onto the computer system;

instructions for executing the operating system setup; and instructions for initiating the windows-based install of the at least one prescribed software package in response to the hook, the windows-based install being carried out according to the corresponding software package installer.

32. The computer program of claim 31, wherein the windows-based install includes:

A) an inquiry as to whether or not there is at least one software package to install, and
  i) if none, then ending the automated installation of software packages, otherwise,
  ii) if at least one, then
    a) reading and launching a first windows-based software package installer,
    b) monitoring progress of the windows-based software package installer to completion, and
    c) checking for any errors which may have occurred during the software package installation and
      c1) if no errors, then cleaning up the software package installer from the computer system and repeating the above beginning at A), and
      c2) if errors, then retrying the given windows-based software package installer up to a maximum number of times, beginning again at step A) and upon the number of retries exceeding the maximum number, failing the computer system.

33. The computer program of claim 31, wherein the at least one prescribed software package includes at least one software package as identified by a custom configured computer system customer order in a build-to-order manufacturing process.

34. The computer program of claim 31, further comprising:

instructions for loading a RUN.WBI control file is onto the computer system, the RUN.WBI control file including a listing of descriptions of the at least one prescribed software package to be installed and further being accessed during the windows-based install of the at least one prescribed software package.

35. The computer program of claim 34, wherein each line of the RUN.WBI control file is a description a software package to be installed.

36. The computer program of claim 35, wherein each description is a comma delimited line characterized by a wrapper filename to be executed, a setup command line to be passed to the wrapper once loaded, and option parameters, the optional parameters including a cleanup directory, a timeout parameter, and a reboot parameter.

37. The computer program of claim 36, wherein the wrapper filename is a full name of a dynamic link library (DLL) wrapper, the DLL wrapper for interfacing with a prescribed windows-based installation type.

38. The computer program of claim 37, further comprising instructions for caching the DLL wrapper in memory of the computer system.

* * * * *